(12) United States Patent
Ng et al.

(10) Patent No.: US 10,691,925 B2
(45) Date of Patent: Jun. 23, 2020

(54) ENHANCED FACE-DETECTION AND FACE-TRACKING FOR RESOURCE-LIMITED EMBEDDED VISION SYSTEMS

(71) Applicant: AltumView Systems Inc., Burnaby (CA)

(72) Inventors: Him Wai Ng, Coquitlam (CA); Xing Wang, Burnaby (CA); Yu Gao, North Vancouver (CA); Rui Ma, Burnaby (CA); Ye Lu, Coquitlam (CA)

(73) Assignee: AltumView Systems Inc., Port Moody, BC (CA)

( * ) Notice: Subject to any disclaimer, the term of this patent is extended or adjusted under 35 U.S.C. 154(b) by 137 days.

(21) Appl. No.: 15/943,728

(22) Filed: Apr. 3, 2018

(65) Prior Publication Data
US 2019/0130167 A1   May 2, 2019

Related U.S. Application Data

(63) Continuation-in-part of application No. 15/796,798, filed on Oct. 28, 2017, now Pat. No. 10,510,157.

(51) Int. Cl.
*G06K 9/00* (2006.01)
*G06N 5/04* (2006.01)
*G06T 7/70* (2017.01)
*G06K 9/46* (2006.01)

(52) U.S. Cl.
CPC ..... *G06K 9/00255* (2013.01); *G06K 9/00268* (2013.01); *G06K 9/00288* (2013.01);
(Continued)

(58) Field of Classification Search
CPC ...... G06N 3/0454; G06N 3/0481; G06N 3/08; G06N 5/046; G06N 20/10; G06T 7/70;
(Continued)

(56) References Cited

U.S. PATENT DOCUMENTS 6,301,370 B1 * 10/2001 Steffens ............. G06K 9/00228
382/103
9,171,197 B2 * 10/2015 Huang ............... G06K 9/00261
(Continued)

OTHER PUBLICATIONS

Breitenstein et al. "Real-time face pose estimation from single range images." 2008 IEEE Conference on Computer Vision and Pattern Recognition. IEEE, 2008. (Year: 2008).*
(Continued)

*Primary Examiner* — Katrina R Fujita

(57) ABSTRACT

Embodiments described herein provide various examples of a real-time face-detection, face-tracking, and face-pose-selection subsystem within an embedded vision system. In one aspect, a process for identifying near-duplicate-face images using this subsystem is disclosed. This process includes the steps of: receiving a determined best-pose-face image associated with a tracked face when the tracked face is determined to be lost; extracting an image feature from the best-pose-face image; computing a set of similarity values between the extracted image feature and each of a set of stored image features in a feature buffer, wherein the set of stored image features are extracted from a set of previously transmitted best-pose-face images; determining if any of the computed similarity values is above a predetermined threshold; and if no computed similarity value is above the predetermined threshold, transmitting the best-pose-face image to a server and storing the extracted image feature into the feature buffer.

14 Claims, 10 Drawing Sheets

(52) U.S. Cl.
CPC ..... *G06K 9/00295* (2013.01); *G06K 9/00302* (2013.01); *G06K 9/4628* (2013.01); *G06N 5/046* (2013.01); *G06T 7/70* (2017.01); *G06T 2207/30201* (2013.01)

(58) Field of Classification Search
CPC ...... G06T 2207/30201; G06K 9/00255; G06K 9/00268; G06K 9/00288; G06K 9/00295; G06K 9/00302; G06K 9/4628
See application file for complete search history.

(56) References Cited

U.S. PATENT DOCUMENTS

| | | | | |
|---|---|---|---|---|
| 9,195,883 | B2* | 11/2015 | Brewer | G06K 9/00302 |
| 2003/0235332 | A1* | 12/2003 | Moustafa | G06K 9/00241 |
| | | | | 382/157 |
| 2006/0120604 | A1* | 6/2006 | Kim | G06K 9/00228 |
| | | | | 382/181 |
| 2015/0304551 | A1* | 10/2015 | Funamoto | H04N 5/23219 |
| | | | | 348/349 |
| 2016/0253807 | A1* | 9/2016 | Jones | G06K 9/4628 |
| | | | | 382/154 |
| 2018/0158240 | A1* | 6/2018 | Saito | G06K 9/00228 |
| 2018/0204097 | A1* | 7/2018 | Karki | G06T 7/97 |

OTHER PUBLICATIONS

Zhang, Tong. "Video security with human identification and tracking." 2014 IEEE International Conference on Multimedia and Expo Workshops (ICMEW). IEEE, 2014. (Year: 2014).*

* cited by examiner

ENHANCED FACE-DETECTION AND FACE-TRACKING FOR RESOURCE-LIMITED EMBEDDED VISION SYSTEMS

PRIORITY CLAIM AND RELATED PATENT APPLICATIONS

This patent application is a continuation-in-part of, and hereby claims the benefit of priority under 35 U.S.C. § 120 to co-pending U.S. patent application Ser. No. 15/796,798, filed on 28 Oct. 2017, entitled, "Method and Apparatus for Real-time Face-Tracking and Face-Pose-Selection on Embedded Vision Systems," by inventors Mehdi Seyfi, Xing Wang, Minghua Chen, Kaichao Wang, Weiming Wang, Him Wai Ng, Jiannan Zheng, and Jie Liang, having Patent Application No. The above-listed application is hereby incorporated by reference as a part of this patent document.

This patent application is also related to a co-pending U.S. patent application entitled, "Joint Face-Detection and Head-Pose-Angle-Estimation Using Small-scale Convolutional Neural Network (CNN) Modules for Embedded Systems," by inventors Xing Wang, Mehdi Seyfi, Minghua Chen, Him Wai Ng, and Jie Liang, having patent application Ser. No. 15/789,957, and filed on 20 Oct. 2017. The above-listed application is hereby incorporated by reference as a part of this patent document.

TECHNICAL FIELD

The present disclosure generally relates to the field of machine learning and artificial intelligence, and more specifically to systems, devices and techniques for performing real-time face-detection, face-tracking and duplicated-face-detection on digital images captured on resource-limited embedded vision systems.

BACKGROUND

Deep learning (DL) is a branch of machine learning and artificial neural network based on a set of algorithms that attempt to model high level abstractions in data by using a deep graph with multiple processing layers. A typical DL architecture can include many layers of neurons and millions of parameters. These parameters can be trained from large amount of data on fast GPU-equipped computers, guided by novel training techniques that can work with many layers, such as rectified linear units (ReLU), dropout, data augmentation, and stochastic gradient descent (SGD).

Among the existing DL architectures, convolutional neural network (CNN) is one of the most popular DL architectures. Although the idea behind CNN has been known for more than 20 years, the true power of CNN has only been recognized after the recent development of the deep learning theory. To date, CNN has achieved numerous successes in many artificial intelligence and machine learning applications, such as face recognition, image classification, image caption generation, visual question answering, and automatic driving cars.

Face detection, i.e., detecting and locating the position of each face in an image, is usually the first step in many face recognition applications. A modern face detection system often includes two main modules: a face detection module and a face tracking module. A face detection module often employs a DL architecture such as CNN to detect human faces in digital images. Once a new face (i.e., a new person) is detected by the face detection module in an image frame of a video, the face tracking module tracks the new person through subsequent image frames in the video to find/re-identify the same person in each of the subsequent image frames. For some low-complexity embedded system applications, the face tracking module can be implemented based on some simple tracking techniques, e.g., Kalman filter and Hungarian algorithm.

In many face detection applications, it is also desirable to perform face-pose estimation because each person's head/face can have different orientations, i.e., different poses in different images. Moreover, to avoid sending and storing too many faces of the same person, it is also desirable to keep track of the pose change of each face, and send just the face image corresponding to the "best pose," e.g., the face that is the closest to the frontal view (i.e., with the smallest rotations) of each detected person. Various techniques can be used to estimate the pose of the person's head/face. One example technique is to first estimate the locations of some facial landmarks, such as eyes, nose, and mouth, and then estimate the pose based on these landmark locations. Another technique involves representing the head pose with three Euler angles, i.e., yaw, pitch and roll, and estimating the pose directly with these three angles. Hence, when a tracked person/face is lost by the face tracking module, and the corresponding face tracker needs to be destroyed, a face image of that face having the best pose can be transmitted and stored for further references. Using a CNN-based DL architecture, face detection and face-pose-estimation can be performed as a joint process.

A large number of face detection techniques can easily detect near frontal faces. However, robust and fast face detection in uncontrolled situations can still be a challenging problem, because such situations are often associated with significant amount of variations of faces, including pose changes, occlusions, exaggerated expressions, and extreme illumination variations. Some effective CNN-based face detection techniques that can manage such uncontrolled situations include (1) a cascaded-CNN framework described in Li et al., "*A Convolutional Neural Network Cascade for Face Detection,*" Proc. IEEE Conf on Computer Vision and Pattern Recognition, Jun. 1, 2015 (referred to as "the cascaded CNN" or "the cascaded CNN framework" hereinafter"), and (2) a multitask-cascaded-CNN framework described in Zhang et al., "*Joint Face Detection and Alignment Using Multitask Cascaded Convolutional Networks,*" IEEE Signal Processing Letters, Vol. 23, No. 10, pp. 1499-1503, October 2016 (referred to as "the MTCNN" or "the MTCNN framework" hereinafter).

However, due to the high complexity involved in the MTCNN framework and often limited computational resources available within an embedded system, many challenges exist to implement the MTCNN-based face detection into an embedded system to achieve satisfactory real-time performance. Moreover, the simple face tracking techniques used by the embedded systems often result in many near-duplicate faces being tracked and transmitted, thereby wasting computational resources and network bandwidth.

SUMMARY

Embodiments described herein provide various examples of a real-time face-detection, face-tracking, and face-pose-selection subsystem within an embedded vision system. In one aspect, a process for identifying near-duplicate-face images and selectively transmitting best-pose-face images to a server within such a system is disclosed. This process includes the steps of: receiving a determined best-pose-face image associated with a tracked face when the tracked face is determined to be lost; extracting an image feature from the best-pose-face image; computing a set of similarity values between the extracted image feature and each of a set of stored image features in a feature buffer, wherein the set of stored image features are extracted from a set of previously transmitted best-pose-face images; determining if any of the computed similarity values is above a predetermined threshold; and if no computed similarity value is above the predetermined threshold, transmitting the best-pose-face image to a server and storing the extracted image feature into the feature buffer.

In some embodiments, the tracked face is determined to be lost when the tracked face is blocked by an object for a predetermined number of video frames.

In some embodiments, the image feature is one of or a combination of: a histogram of oriented gradients (HoG) feature, a Han-like feature, a scale-invariant-feature transform (SIFT)-feature, and a deep-learning-based face feature.

In some embodiments, the set of stored image features is the same type of feature as the extracted image feature.

In some embodiments, the process computes a similarity value between the extracted image feature and a stored image feature in the set of stored image features by computing a cosine similarity between the extracted image feature and the stored image feature.

In some embodiments, if the image feature is a deep learning (DL) based face feature, comparing the extracted image feature with the set of stored image features allows for determining if the tracked face is a duplicated face of a stored face of the same person but having a different pose from the stored face.

In some embodiments, if it is determined that any of the computed similarity values is above the predetermined threshold, the process prevents transmitting the best-pose-face image to the server.

In one aspect, a process for performing real-time face detection on grayscale input images captured by a camera is disclosed. This process includes the steps of: receiving a face-image training dataset; converting color images in the face-image training dataset into grayscale training images; training a convolutional-neural-network (CNN) face detection module using the converted grayscale images; receiving grayscale input images from a camera; and performing face detection on the received grayscale input images using the CNN face detection module trained with the converted grayscale training images.

In some embodiments, the face-image training dataset is a large-scale public training dataset composed of primarily color images In some embodiments, the grayscale input images are captured under a monochrome or a grayscale illumination condition.

In some embodiments, the grayscale illumination condition includes a LED lighting.

In some embodiments, the camera is configured to capture only grayscale images.

In some embodiments, the CNN face detection module includes a multitask-cascaded-CNN (MTCNN).

In another aspect, an embedded system capable of identifying near-duplicate face images and selectively transmitting best-pose-face images to a server is disclosed. This embedded system includes: a processor; and a memory coupled to the processor. The memory stores instructions that, when executed by the one or more processors, cause the system to: receive a determined best-pose-face image associated with a tracked face when the tracked face is determined to be lost; extract an image feature from the best-pose-face image; compute a set of similarity values between the extracted image feature and each of a set of stored image features in a feature buffer, wherein the set of stored image features are extracted from a set of previously transmitted best-pose-face images; determine if any of the computed similarity values is above a predetermined threshold; and if no computed similarity value is above the predetermined threshold, transmit the best-pose-face image to a server and store the extracted image feature into the feature buffer.

In some embodiments, the embedded system is one of: a surveillance camera system, a machine vision system, a drone system, a robotic system, a self-driving vehicle, and a mobile device.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Throughout the specification, the following terms have the meanings provided herein, unless the context clearly dictates otherwise. The terms "head pose," "face pose," and "pose" are used interchangeably to mean the specific orientation of a person's head within an image. The terms "a tracked person," "a person being tracked," and "a face tracker" are used interchangeably to mean a person being detected and tracked in digital video images by the disclosed face-detection and face-tracking systems.

Embedded Vision Systems

Figure 1:
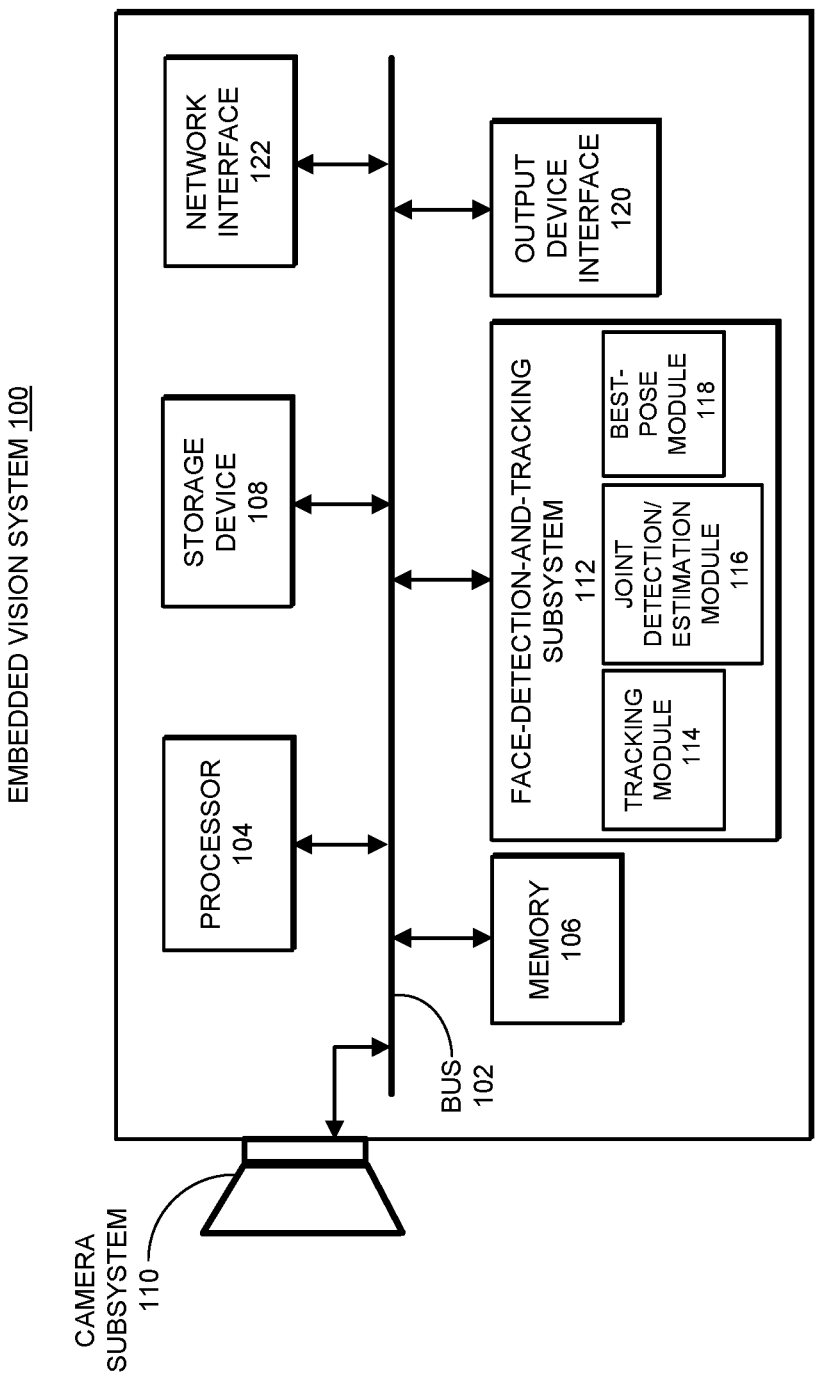
FIG. 1 illustrates an exemplary embedded vision system which includes real-time face-detection, face-tracking, and face-pose-estimation functionalities in accordance with some embodiments described herein.

FIG. 1 illustrates an exemplary embedded vision system 100 which includes real-time face-detection, face-pose-estimation, and face-tracking functionalities in accordance with some embodiments described herein. Embedded vision system 100 can be integrated with or implemented as a surveillance camera system, a machine vision system, a drone system, a robotic system, a self-driving vehicle, or a mobile device. As can be seen in FIG. 1, embedded vision system 100 can include a bus 102, a processor 104, a memory 106, a storage device 108, a camera subsystem 110, a face-detection-and-tracking subsystem 112, an output device interface 120, and a network interface 122. In some embodiments, embedded vision system 100 is a low-cost embedded system.

Bus 102 collectively represents all system, peripheral, and chipset buses that communicatively couple the various components of embedded vision system 100. For instance, bus 102 communicatively couples processor 104 with memory 106, storage device 108, camera system 110, face-detection-and-tracking subsystem 112, output device interface 120, and network interface 122.

From memory 106, processor 104 retrieves instructions to execute and data to process in order to control various components of embedded vision system 100. Processor 104 can include any type of processor, including, but not limited to, a microprocessor, a mainframe computer, a digital signal processor (DSP), a personal organizer, a device controller and a computational engine within an appliance, and any other processor now known or later developed. Furthermore, processor 104 can include one or more cores. Processor 104 itself can include a cache that stores code and data for execution by processor 104.

Memory 106 can include any type of memory that can store code and data for execution by processor 104. This includes but not limited to, dynamic random access memory (DRAM), static random access memory (SRAM), flash memory, read only memory (ROM), and any other type of memory now known or later developed.

Storage device 108 can include any type of non-volatile storage device that can be integrated with embedded vision system 100. This includes, but is not limited to, magnetic, optical, and magneto-optical storage devices, as well as storage devices based on flash memory and/or battery-backed up memory.

Bus 102 is also coupled to camera subsystem 110. Camera subsystem 110 is configured to capture still images and/or video images at predetermined resolutions and couple the captured image or video data to various components within embedded vision system 100 via bus 102, such as to memory 106 for buffering and to face-detection-and-tracking subsystem 112 for face-detection, face-pose-estimation, face-tracking, and best-pose-selection. Camera subsystem 110 can include one or more digital cameras. In some embodiments, camera subsystem 110 includes one or more digital cameras equipped with wide-angle lenses. The captured images or videos by camera subsystem 110 can have different resolutions including high-resolutions such as at 1280×720p, 1920×1080p or other high resolutions.

Face-detection-and-tracking subsystem 112 further includes a face tracking module 114, a joint face-detection and face-pose-estimation module 116, and a best-pose-selection module 118. In some embodiments, face-detection-and-tracking subsystem 112 is configured to receive the captured video images, such as captured high-resolution video images via bus 102, perform CNN-based face-detection and face-pose-estimation operations on the received video images using joint face-detection and face-pose-estimation module 116 to detect faces within each video image and generate face-pose-estimations for each detected face. Face-detection-and-tracking subsystem 112 is further configured to track each uniquely detected face through a sequence of video images using face tracking module 114, and determine the best pose for each tracked face using best-pose-selection module 118 when a tracked face is determined to be lost. Joint face-detection and face-pose-estimation module 116 can be implemented with one or more hardware CNN modules. Generally, face-detection-and-tracking subsystem 112 is configured to track multiple people at the same time. Ideally, face-detection-and-tracking subsystem 112 should be configured to simultaneously track as many persons as possible. In some embodiments, joint face-detection and face-pose-estimation module 116 can be implemented with a coarse-to-fine multi-stage MTCNN architecture. If embedded vision system 100 is a low-cost embedded system, joint face-detection and face-pose-estimation module 116 can be implemented with one or more low-cost hardware CNN modules such as a built-in CNN module within HiSilicon Hi3519 system-on-chip (SoC).

Output device interface 120 which is also coupled to bus 102, enables for example, the display of the results generated by face-detection-and-tracking subsystem 112. Output devices used with output device interface 120 include, for example, printers and display devices, such as cathode ray tube displays (CRT), light-emitting diode displays (LED), liquid crystal displays (LCD), organic light-emitting diode displays (OLED), plasma displays, or electronic paper.

Finally, as shown in FIG. 1, bus 102 also couples embedded vision system 100 to a network (not shown) through a network interface 122. In this manner, embedded vision system 100 can be a part of a network (such as a local area network ("LAN"), a wide area network ("WAN"), or an Intranet, or a network of networks, such as the Internet. In some embodiments, face-detection-and-tracking subsystem 112 is configured to send a detected face having the best pose among multiple detected faces of a given person to a control center or a main server through network interface 122 and the network. Any or all components of embedded vision system 100 can be used in conjunction with the subject disclosure.

The Proposed Face-Detection-and-Tracking Architecture

Figure 2:
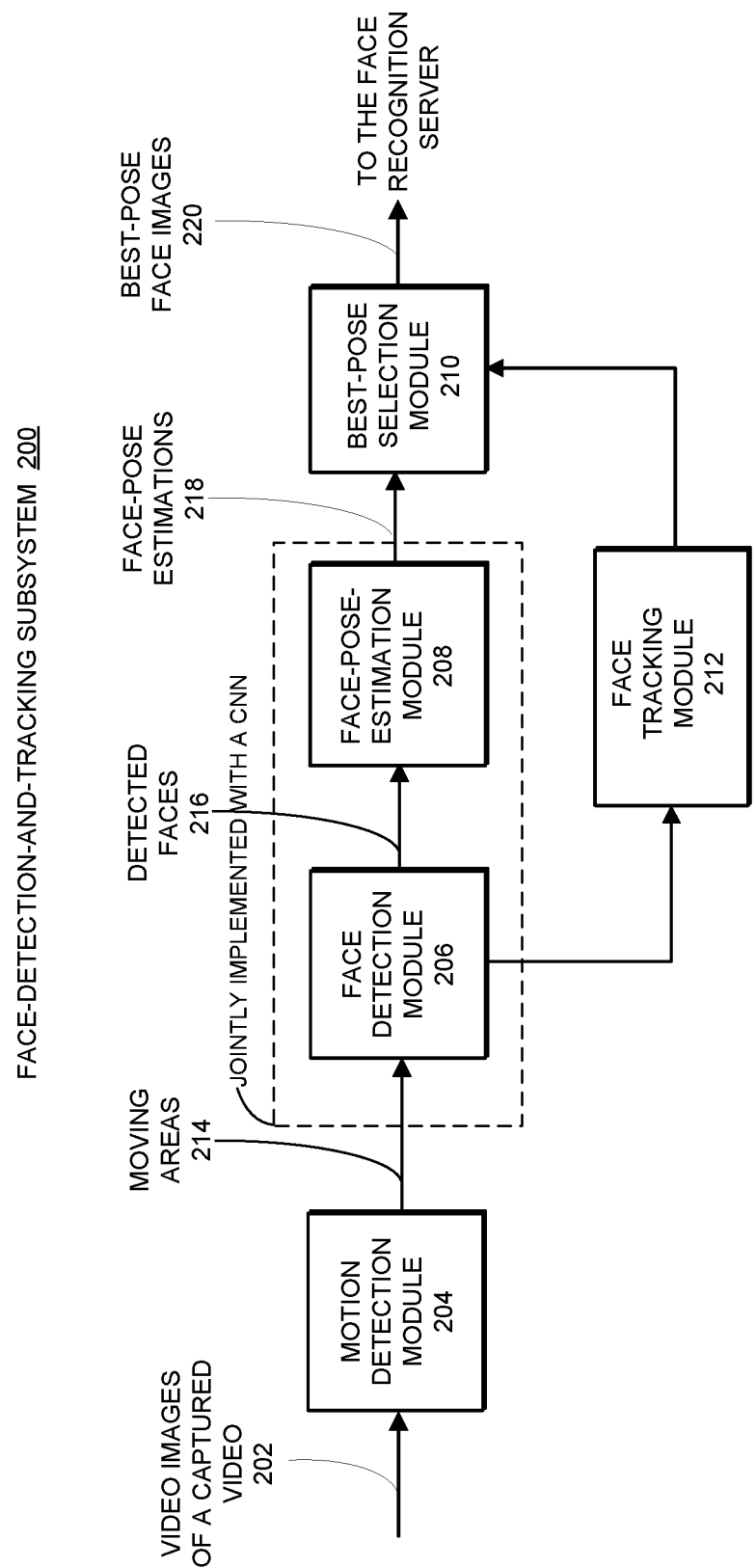
FIG. 2 shows a block diagram of an exemplary implementation of the face-detection-and-tracking subsystem within the embedded vision system of FIG. 1 in accordance with some embodiments described herein.

FIG. 2 shows a block diagram of an exemplary implementation 200 of face-detection-and-tracking subsystem 112 within embedded vision system 100 in accordance with some embodiments described herein. As shown in FIG. 2, face-detection-and-tracking subsystem 200 receives a sequence of video images of a captured video 202 as input and generates the best-pose face image 220 for each uniquely detected face/person from video 202 as output. Note that face-detection-and-tracking subsystem 200 includes at least a motion detection module 204, a face detection module 206, a face-pose-estimation module 208, a best-pose-selection module 210, and a face tracking module 212. As mentioned above, face-detection-and-tracking subsystem 200 is configured to track multiple people within captured video 202 at the same time. Ideally, face-detection-and-tracking subsystem 200 is configured to simultaneously track as many people as possible. Face-detection-and-tracking subsystem 200 can also include additional modules not shown in FIG. 2. We now describe each of the blocks in face-detection-and-tracking subsystem 200 in more detail.

Motion Detection

As can be seen, a given video image of captured video 202 is first received by motion detection module 204. In some embodiments, it is assumed that a human face captured in video image 202 is associated with a motion, which begins when a person first enters the field of view of the camera and ends when that same person exits the field of view of the camera or being obscured by another person or an object. Hence, to reduce the computational complexity of face-detection-and-tracking subsystem 200, motion detection module 204 can be used to preprocess each video frame to locate and identify those areas within each video frame which are associated with motions. In this manner, face detection module 206 is only needed to operate on those detected moving areas to detect human faces, whereas the remaining areas within the video image which are not associated with a motion can be ignored (i.e., not further processed by face-detection-and-tracking subsystem 200), thereby increasing overall system efficiency and image processing speed. However, there are scenarios where a person enters the video then stops moving. In such cases, an initially moving face becomes a still face. We provide some techniques below which are capable of detecting and handling such still faces.

In some embodiments, motion detection module 204 detects moving areas within a newly received video image by directly computing a difference image between the current video image and a previously video image in a sequence of video frames. In one embodiment, the current video image is compared with the immediate preceding video image with respect to the current image in the sequence of video frames. In some embedded systems, motion detection module 204 can be implemented with built-in motion detection hardware, such as a DSP. For example, when face-detection-and-tracking subsystem 200 is implemented using Hi3519 SoC, motion detection module 204 can be implemented with the built-in motion detection function implemented on a DSP within Hi3519 SoC. The output from motion detection module 204 includes a set of identified moving areas 214 which can have many different sizes. Note that, for a detected moving human object, the associated moving area can include both the human face and the human body, and can also include more than one face. Hence, each identified moving area is then sent to the subsequent face detection module 206 to detect most or all faces within each detected moving area.

More detail of motion detection module 204 is described in U.S. patent application Ser. No. 15/789,957, filed on 20 Oct. 2017 and entitled "Joint Face-Detection and Head-Pose-Angel-Estimation Using Small-scale Convolutional Neural Network (CNN) Modules for Embedded Systems," the content of which is incorporated herein by reference.

Face-Detection and Face-Pose-Estimation

For each of the detected moving areas 214 generated by motion detection module 204, a CNN-based face detection module 206 can be used to detect some or all faces with the detected moving area. Many different techniques can be used to implement face detection module 206. For example, a histogram of oriented gradients (HoG)-feature comparison technique in conjunction with a support vector machine (SVM) classifier can be used to implement face detection module 206. In some embodiments, face detection module 206 can be implemented with a coarse-to-fine multi-stage CNN architecture described in Zhang et al., "*Joint Face Detection and Alignment Using Multitask Cascaded Convolutional Networks,*" *IEEE Signal Processing Letters*, Vol. 23, No. 10, pp. 1499-1503, October 2016. Other than using the MTCNN architecture, face detection module 206 can be implemented with other known or later developed CNN-based face-detection architectures and techniques without departing from the scope of the described technology. Face detection module 206 generates a set of detected faces 216 and the corresponding bounding box locations. Note that face tracking module 210 can be used to track previously detected faces of processed video images based on the current output of face detection module 206 associated with a newly processed video image.

When a person is moving in a video, the person's head/face can have different orientations, i.e., different poses in different video images. Estimating the pose of each detected face allows for keeping track of the pose change of each face through the sequence of video frames, and when a face tracker is considered lost and needs to be removed, sending just the face image corresponding to the "best pose," i.e., the face image that is the closest to the frontal view (i.e., having the smallest rotations) of each detected person to the main server for face recognition. Face-detection-and-tracking subsystem 200 uses a face-pose-estimation module 208 to estimate the pose of each detected face from face detection module 206 and generate face-pose estimations 218. The outputs from face-pose-estimation module 208 can be used by best-pose-selection module 210 to update the best pose for each tracked person as that person moves through the sequence of video frames.

In one technique, face pose is estimated based on the locations of some facial landmarks, such as eyes, nose, and mouth, e.g., by computing distances of these facial landmarks from the frontal view. Another technique for face pose estimation involves representing the face pose with three Euler angles, i.e., yaw, pitch and roll, and estimating the pose directly with these three angles. However, the angle-based pose estimation approach typically has a lower complexity than the landmark-based approach because the angle-based approach requires just three values whereas the latter one generally requires more than three landmark coordinates in its estimation. Moreover, the angle-based pose estimation approach also facilitates performing a simple best-pose-estimation by using the sum of absolute values of three pose angles.

Both of the above-described face-pose-estimation techniques can be implemented with traditional methods without using a deep neural network or with a deep neural network such as a CNN. When implemented with a CNN, face detection module 206 and face-pose-estimation module 208 can be jointly implemented as a single neural network. A CNN-based joint face-detection and face-pose-estimation system and technique has been described in U.S. patent application Ser. No. 15/789,957, filed on 20 Oct. 2017 "Joint Face-Detection and Head-Pose-Angle-Estimation Using Small-scale Convolutional Neural Network (CNN) Modules for Embedded Systems," the content of which is incorporated herein by reference.

In face-detection-and-tracking subsystem 200, face-pose-estimation module 208 is followed by best-pose-selection module 210 configured to determine and update the "best pose" for each tracked person from a sequence of pose-estimations associated with a sequence of detected faces of the tracked person in a sequence of video frames. In some embodiments, the best pose is defined as a face pose closest to the frontal view (i.e., with the smallest overall head rotations). As can be seen in FIG. 2, best-pose-selection module 210 can be coupled to face tracking module 212 to receive face tracking information. Hence, best-pose-selection module 210 can keep track of each tracked person as the pose of this person is continuously estimated at face pose estimation module 208 and the best pose of this person is continuously updated at best-pose-selection module 210. In some embodiments, when a tracked person is determined to have disappeared from the video by face tracking module 212 (i.e., the associated face tracker is determined to be lost), best-pose-selection module 210 is configured to transmit the detected face image corresponding to the current best pose (i.e., best-pose face image 220) of the tracked person to the control center or the main server for face recognition tasks.

A number of techniques can be implemented on face tracking module 212 to determine if a tracked person has disappeared from the video. For example, one technique keeps track of the most recently computed face bounding box for each person. Assuming there is no extreme movement of a tracked person, then an overlap of some degree is expected between the most-recently computed bounding box of the tracked person and the immediate preceding bounding box of this tracked person. Hence, when face tracking module 212 determines that there is no overlap between the most-recently computed bounding box of the tracked person and the immediate preceding bounding box of this tracked person, face tracking module 212 determines that the tracked person has disappeared from the video. As another technique, face tracking module 212 can keep track of the assigned labels for all of the detected faces (i.e., the face associations between a set of unique labels and the corresponding set of detected faces). Next, if a given label previously assigned to a tracked person in a previously processed video image is not assigned to any detected face in the currently processed video image, the tracked person associated with the given label can be considered lost.

In some scenarios, a person remaining in the video for a very long time can cause a long delay before the best pose of that person can be transmitted to the control center or the main server. To mitigate this problem, some embodiments provide an early pose submission technique. In a particular embodiment of the early pose submission technique, during the processing of a sequence of video images, if an estimated face pose of a tracked person is determined to be sufficient good in any video frame, for example when compared with a threshold value, the detected face image corresponding to the "good-enough pose" can be immediately transmitted to the server without waiting for the tracked person to leave the video. More specifically, if facial landmark points are generated by the neural network alongside the detected face image, the distance of the determined landmarks with respect to reference facial landmarks associated with a full-frontal face pose can be compared with a threshold distance. Alternatively, if pose angles are generated by the neural network alongside the detected face image, the sum of absolute values of the estimated pose angles can be compared with the threshold angle. In both cases, when the newly computed pose metric is below the corresponding threshold value, the newly computed pose metric of the tracked person can be considered as "good enough" and the corresponding face image of the tracked person can then be transmitted to the server. In these embodiments, to avoid sending duplicated faces of the same person, after the tracked person is determined to have disappeared from the video, the determined best pose of that person is transmitted to the control center or the server only if no such "good enough" face image has been submitted to the control center or the server.

Face Tracking

In face-detection-and-tracking subsystem 200, to find the best pose of each tracked person, it is necessary to track the location of the tracked person in each frame of the captured video, from the time the person is initially detected in the video until the time the person is determined to have disappeared from the video.

In some embodiments, the CNN-based face-detection and face-pose-estimation modules 206 and 208 are applied to every frame of the captured video 202. In other words, the input to motion detection module 204 in subsystem 200 includes every frame of the capture video 202. This is possible for a high-performance embedded vision system 100 or when the capture video frame rate is quite low. In these embodiments, face-detection-and-tracking subsystem 200 generates a set of detected faces and the corresponding bounding box coordinates for every frame of the captured video 202. Using the face detection information from the sequence of video frames, face tracking module 212 can perform either single-face tracking or multi-face tracking in a sequential manner. For example, if captured video 202 only includes a single person, face tracking based on the processed video frames simply involves determining when the tracked person is no longer in the video.

If capture video 202 includes multiple people, face tracking module 212 needs to be configured to perform multi-face tracking to simultaneously track the multiple people. In one embodiment, multiple people can be initially detected within a single video frame. In another embodiment, multiple people can be separately detected within multiple video frames as the multiple people enter the video at different times. In some embodiments, after multiple people are detected and labeled, face tracking module 212 performs multi-face tracking to simultaneously track the detected multiple people by matching a set of labeled bounding boxes in a previous video frame to the identified bounding boxes in a newly processed video frame. In one embodiment, a Hungarian algorithm can be used to associate labeled faces in the previous video frame to the identified bounding boxes in the newly processed video frame. For example, a similarity matrix between the bounding boxes in the previous video frame and the bounding boxes in the newly processed video frame can be constructed, wherein each matrix element measures a similarity score between a given bounding box in the previous video frame and a bounding box in the newly processed video frame. The similarity score can be computed using different metrics, one of them being an intersection-of-union between a pair of bounding boxes. For associating bounding boxes in two consecutive video frames, other data association techniques can be used in place of the Hungarian algorithm, and the generated CNN features used for data association can be other than the bounding boxes. For example, to improve the face association performance, some low-cost face features can be considered, such as the face size, aspect ratio, LBP, HOG, histogram of color, among others.

Figure 3:
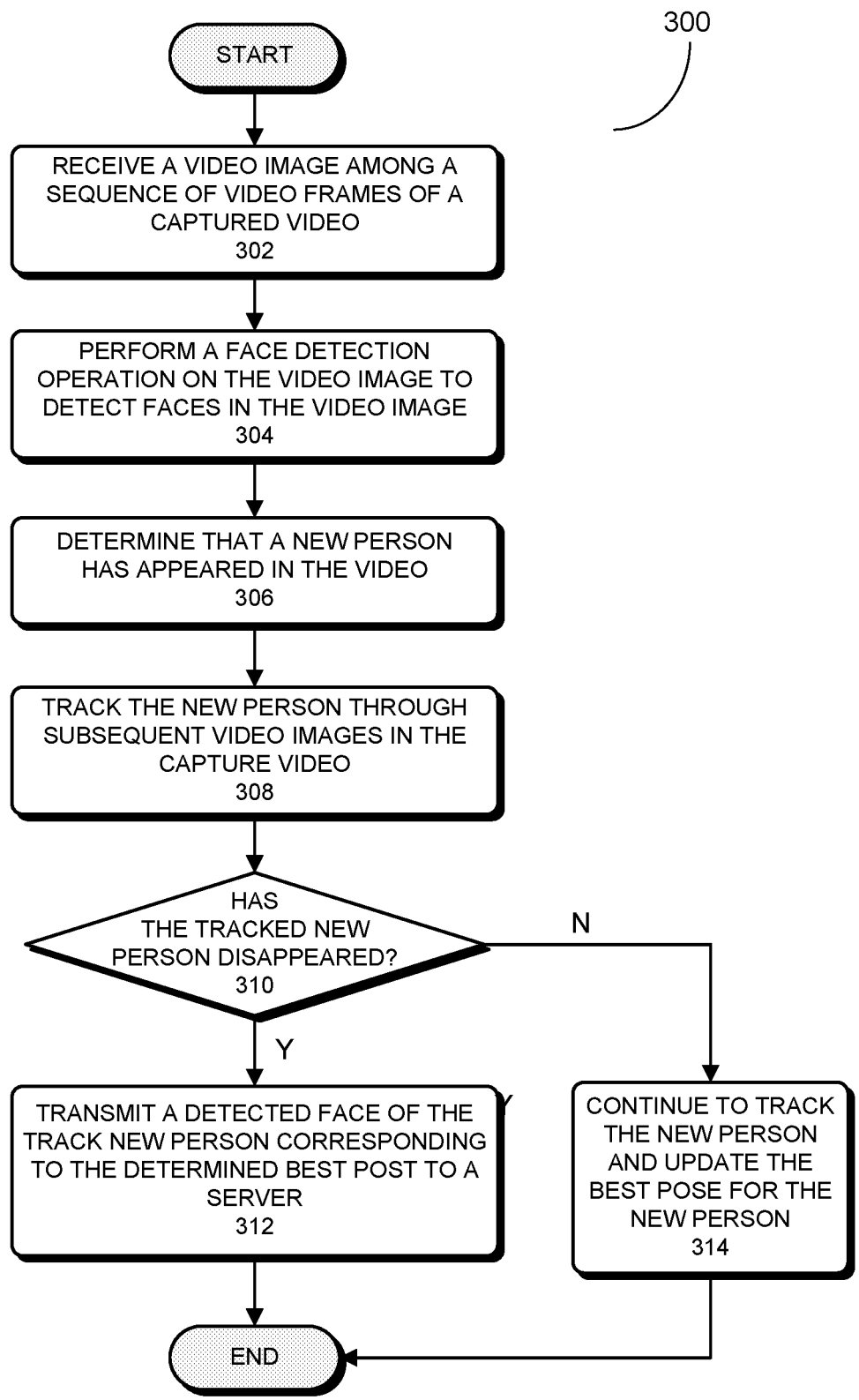
FIG. 3 presents a flowchart illustrating an exemplary process for performing real-time face-detection, face-pose-estimation and face-tracking within an embedded vision system in accordance with some embodiments described herein.

FIG. 3 presents a flowchart illustrating an exemplary process 300 for performing real-time face-detection, face-pose-estimation and face-tracking within an embedded vision system in accordance with some embodiments described herein. The process 300 begins by receiving a video image among a sequence of video frames of a captured video (step 302). In some embodiments, the embedded video system includes a surveillance camera system, a machine vision system, a self-drive car, or a mobile phone. Next, process 300 performs a face detection operation on the video image to detect a set of faces in the video image (step 304). In some embodiments, performing the face detection operation on the video image to detect a set of faces in the video image includes identifying a set of moving areas within the video images using the above-described motion detection module and for each of the set of identified moving areas, applying a CNN-based face detection technique to detect if the moving area includes a human face. In some embodiments, each of the detected face images is defined by a bounding box within the original video image.

Next, process 300 determines that a new person has appeared in the video based on the detected faces (step 306). For example, process 300 can perform a face association operation between a set of labeled detected faces in an immediate preceding video image and the set of unlabeled bounding boxes in the current video image. The process subsequently identifies each of the detected faces not associated with a previously detected face as a new person. Next, process 300 tracks the new person through subsequent video images in the capture video (step 308). For example, process 300 can detect a sequence of new locations of the new person in the subsequent video images. For each of the subsequent video images which contains a new location of the new person, process 300 can compute a face pose for the detected face of the new person at the new location; and update the best pose for the new person.

Figure 4:
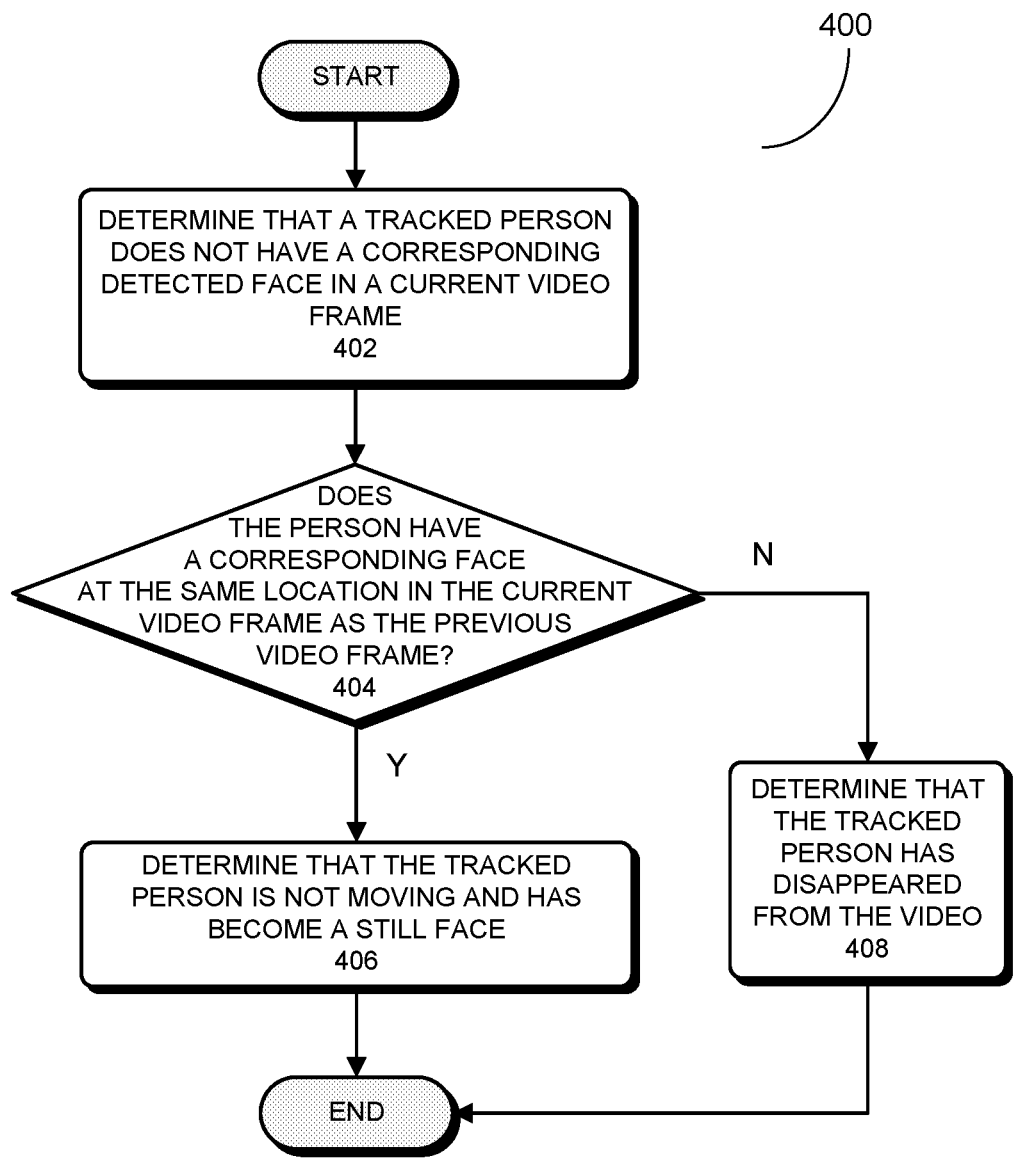
FIG. 4 presents a flowchart illustrating an exemplary process for detecting if a tracked person has disappeared from the video in accordance with some embodiments described herein.

Next, process 300 detects if the tracked new person has disappeared from the video (step 310). FIG. 4 presents a flowchart illustrating an exemplary process 400 for detecting if a tracked person has disappeared from the video in accordance with some embodiments described herein. The process begins by determining that the tracked person does not have a corresponding detected face in a current video frame (step 402). In some embodiments, determining that the tracked person does not have a corresponding detected face in the current video frame includes failing to detect the tracked person at and around a predicted new location in the current video frame. Next, the process detects if the tracked person has a corresponding face at the same location in the current video frame as the location of the detected face of that tracked person in the preceding video frame to the current video frame (step 404). If so, the process determines that the tracked person is not moving and has become a still face (step 406). Otherwise, the process determines that the tracked person has indeed disappeared from the video (step 408).

Returning to FIG. 3, if it is determined at step 310 that the tracked new person has disappeared from the video, process 300 subsequently transmits a detected face of the track new person corresponding to the determined best pose to a server (step 312). Note that transmitting just the face image corresponding to the best pose without sending all of the detected faces significantly reduces network bandwidth and storage space. Otherwise, if the tracked new person remains in the video, process 300 continues to track this person through the subsequent video images and update the best pose for this person (step 314)

Figure 5:
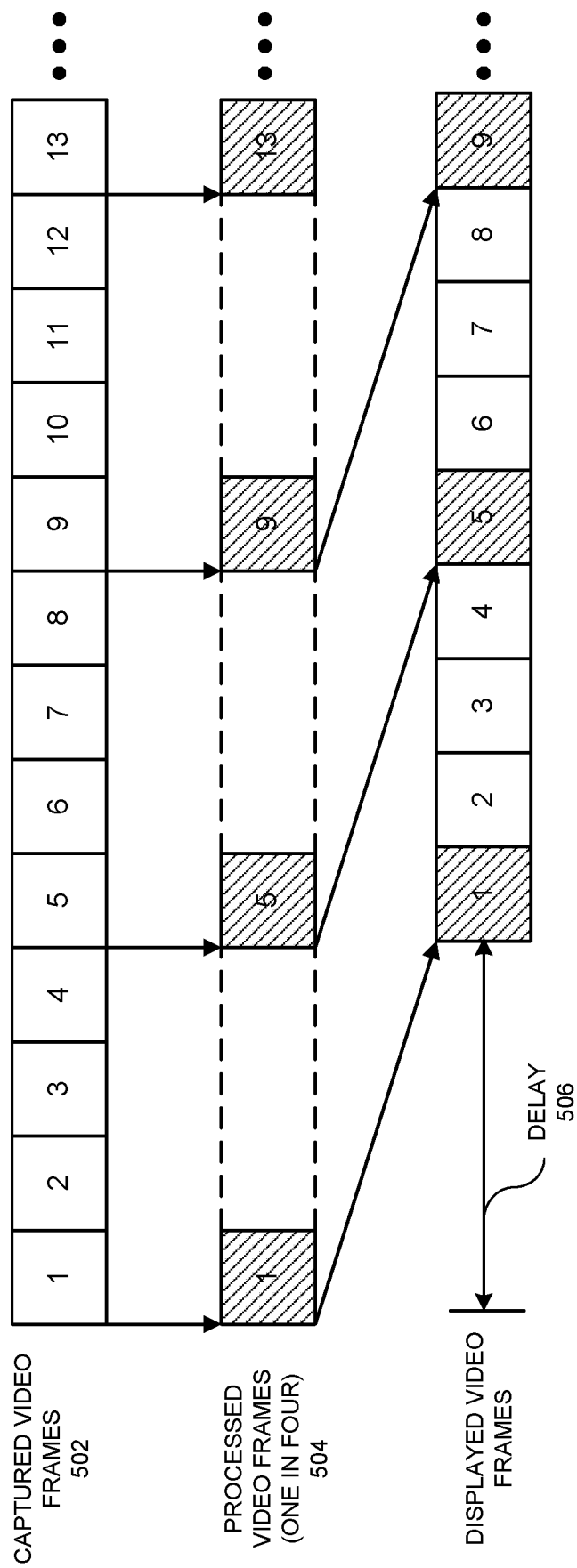
FIG. 5 illustrates a captured sequence of video frames and a corresponding subset of processed video frames in accordance with some embodiments described herein.

Above discussion has assumed that the CNN-based face-detection and face-pose-estimation modules 206 and 208 can be applied to every video frame of captured video 204. However, in some embodiments of the embedded vision system 100, processing every video frame with CNN modules is simply not practical due to the resource and performance limitations of such embedded systems. Moreover, to reduce computational complexity and increase the real-time video processing speed, the CNN-based face-detection and face-pose-estimation modules 206 and 208 do not have to be applied to every video frame. In some embodiments, motion detection module 204 only receives a subset of the captured video frames, e.g., one in every N video frames, and as such, CNN-based face-detection and face-pose-estimation modules 206 and 208 are only applied to the subset of video frames. FIG. 5 illustrates a captured sequence of video frames 502 and a corresponding subset of processed video frames 504 in accordance with some embodiments described herein. In the embodiment shown, only one in every 4 video frames are processed (i.e., N=4) for face detection and face-pose-estimation. Hence, those video frames in between processed video frames do not have tracking information associated with them.

However, it may be necessary to perform face detection and face tracking for those "in-between" video frames which were not processed by the CNN modules. For example, in some applications where the bounding boxes of a tracked face are continuously displayed on a monitor, it is desirable to generate bounding boxes for those in-between frames because otherwise the display of the bounding boxes will flicker constantly. Moreover, when N is large, it becomes more difficult to track multiple people from one processed video frame 504 to the next processed video frame 504 using the face associated technique, because substantially amount of movements might have occurred to multiple tracked people. This situation again requires that face tracking be applied to those in-between video frames.

Figure 6:
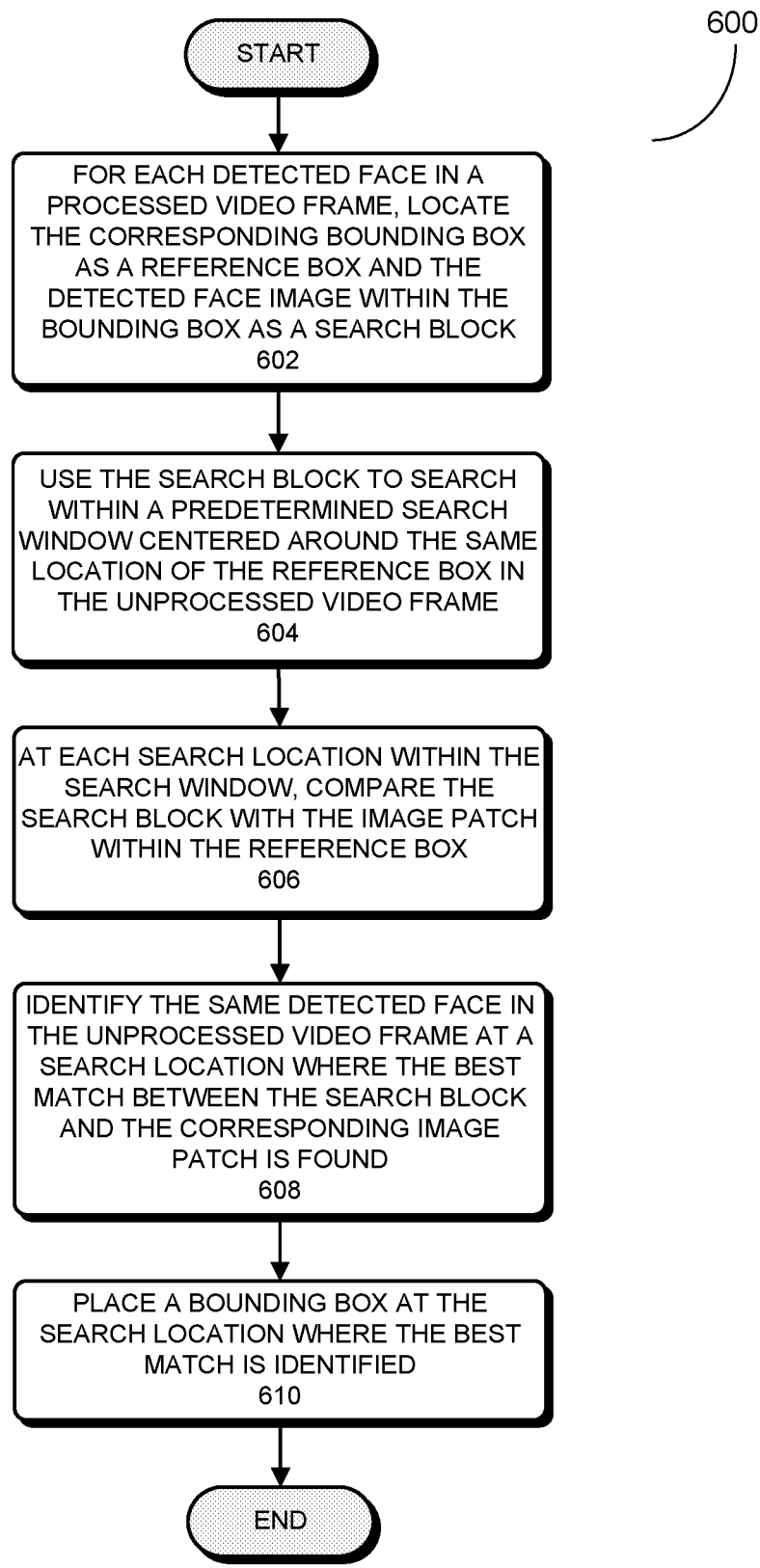
FIG. 6 presents a flowchart illustrating an exemplary process for performing face detection and tracking for unprocessed video frames based on the processed video frames in accordance with some embodiments described herein.

In some embodiments, face tracking module 212 can be configured to locate and label the tracked faces within the in-between video frames without the need of applying face-detection module 206. In some embodiments, face tracking module 212 is configured to determine the location of each tracked face within an unprocessed video frame (e.g., Frame 2) immediately following a processed frame 504 (e.g., Frame 1) based on the determined location of the tracked face in the processed frame (e.g., Frame 1). For example, FIG. 6 presents a flowchart illustrating an exemplary process 600 for performing face detection and tracking for unprocessed video frames based on the processed video frames in accordance with some embodiments described herein. In some embodiments, exemplary process 600 is implemented on face tracking module 212.

For each detected face in a processed video frame, process 600 locates the corresponding bounding box of the detected face as a reference box and the detected face image within the bounding box as a search block (step 602). Next, in a subsequent unprocessed video frame, process 600 uses the search block to search within a search window of a predetermined size and centered around the same location of the reference box in the unprocessed video frame (step 604). More specifically, within the search window, multiple locations (e.g., 64 different locations) of the size of the reference box can be searched. At each of the search locations within the search window, the search block is compared with the image patch within the reference box (step 606). Hence, process 600 identifies the same detected face in the unprocessed video frame at a search location where the best match between the search block and the corresponding image patch is found (step 608). Note that as long as the search window in the unprocessed video frame is sufficiently large and the new location of the detected face does not change too much between two consecutive frames (i.e., assuming no extreme movement), this direct search technique is able to accurately locate the detected face in the unprocessed video frame without using a neural network, and regardless whether the movement of the detected face is linear or nonlinear. Next, process 600 can place a corresponding bounding box at the search location wherein the best match is identified to indicate the new location of the detected face in the unprocessed video frame (step 610). Note that after applying process 600 to a given unprocessed video frame (e.g., Frame 2 in FIG. 5), process 600 can be repeated for other unprocessed video frames (e.g., Frames 3-4 in FIG. 5) immediately following the newly processed video frame based on the detected faces within the newly processed video frame (e.g., Frame 2).

In one embodiment, process 600 can compare the search block against the image patch at a given search location within the search window by computing a similarity score between the search block and the compared image patch. In some embodiments, the similarity between the search block and the image patch can be simply computed as the difference between the search block and the image patch.

In some embodiments, to speed up the above-described search process, face tracking module 212 is configured to predict the new location of each detected face in an unprocessed video frame based on using the reference locations in the processed video image and predicted motions of the detected faces. More specifically, for each detected face in a processed video frame (e.g., Frame #5 in FIG. 5), face tracking module 212 first makes a prediction of the estimated location of the detected face in the unprocessed video frame (e.g., #6 in FIG. 5). In these embodiments, a movement (e.g., the trajectory and speed) of the detected face is first predicted based on multiple face locations of the detected face in the previously processed video frames. For example, in the illustrated video sequence 502 in FIG. 5, the detected face locations in Frames 1 and 5 can be used to predict the new locations of the detected face in Frames 6-8. Note that the prediction of the movement can include either a linear prediction or a non-linear prediction. In linear prediction, the trajectory and speed of the movement can be predicted. In non-linear prediction, a Kalman filter approach can be applied.

Next, for each detected face in the processed video frame, face tracking module 212 uses a corresponding search block to search around the estimated new location (i.e., the search location) of the detected face in the unprocessed video frame. Note that due to the improved accuracy of the estimated location, face tracking module 212 does not need to search many positions around the estimated location. At each of the search locations centered around the estimated location, the search block is compared with the image patch within the search box. Hence, the same detected face can be identified in the unprocessed video frame at a search location where the best match between the search block and the corresponding image patch is found. As a variation to the above process, face tracking module 212 can directly apply the bounding box of the detected face from the previous frame to the estimated location in the unprocessed video frame and use the image patch within the bounding box at the estimated location as the detected face in the unprocessed video frame.

To further reduce the computational complexity and speed up to the face-tracking process, motion detection by motion detection module 204 can be performed on a downsampled/low-resolution version of the sequence of frames, which can be obtained through many standard face detection schemes. One of the approaches for generating downsampled version of the input video frames and performing face detection within such images was described in U.S. patent application Ser. No. 15/657,109, filed on 21 July, entitled "Face Detection Using Small-scale Convolutional Neural Network (CNN) Modules for Embedded Systems," the content of which is incorporated herein by reference.

Face-Tracking under Low Frame Processing Rate

As mentioned above, applying face-detection and face-pose-estimation modules 206 and 208 to every input video frame can be computational intensive due to multi-stage CNN operations. For some embedded systems which capture videos at a high frame rate, performing real-time face-detection and face-pose-estimation on the captured video images become quite challenging. Some low-end embedded video system may not be able to process the input video frames as fast as the new video frames are captured if the processing speed lags the high input frame rate. In such cases, some embedded systems are only able to perform CNN-based face detection and face-pose-estimation on a subset of video frame, e.g., one in every N input video frames (e.g., N=4). As a result, no face detection and face-pose estimation are made for these unprocessed or "in-between" video frames. In such systems, face tracking performance can be quite poor and a tracked face can be easily lost.

To mitigate this problem, one approach is to use the determined face locations in the last two or more processed video frames to predict the face locations for the unprocessed frames immediately following the last one of the two or more processed frames used for making such predictions. For example, in the illustrated example of FIG. 5, processed Frames 1 and 5 can be used to predict face locations for Frames 6-8. As another example, processed Frames 1, 5, and 9 can be used to predict face locations for Frames 10-12. In some embodiments, face location predictions for the unprocessed frames can include using a linear prediction or a more complex scheme such as Kalman filter approach.

Another approach to mitigate the low-frame-processing-rate problem involves using motion estimation to search in one or more subsequently unprocessed video frames for the new location of each detected face in the previous processed frame. Again using FIG. 5 as an example, assuming CNN-based face-detection and face-pose-estimation modules 206 and 208 have been applied to Frame 1 and Frame 5. Due to the large gap between the two processed frames, it can be difficult to directly associate labels in Frame 1 to the detected faces in Frame 5. In some embodiments, the above-described search and label process described in conjunction with FIG. 6 can be recursively applied from Frame 1 to Frame 5. More specifically, using the detected and labeled faces in Frame 1, corresponding faces in Frame 2 are then searched and the reappearing faces in Frame 2 are subsequently labeled. Next, the detected and labeled faces in Frame 2 are used as references to search and label faces in Frame 3, and so on. Eventually, the faces in Frame 4 are also searched and labeled based on the original face detection information from Frame 1. Next, the labeled faces in Frame 4 can be used to label previously detected faces in Frame 5 using one of the standard face association techniques.

As a special case, the CNN-based face-detection and pose-estimation modules 206 and 208 can be applied to every other video frame, for example, Frames 1, 3, 5, 7, etc (i.e., N=2). The CNN-processed frames can subsequently be labeled with one of the face association techniques, such as the intersection-of-union (IoU) technique as described above. Next, for each of the in-between unprocessed video frames (e.g., Frame 2), the location of each tracked face can be simply determined by the interpolation of the corresponding locations of the tracked face in the immediate preceding and the immediate following processed video frames (e.g., Frames 1 and 3). Note that the above technique can be easily extended to a scenario where the CNN-based face-detection and pose-estimation modules 206 and 208 are applied to one in every three video frames (i.e., N=3).

Detection of Still Faces

As mentioned above, if it is assumed that a detected person in a capture video is constantly moving and a motion detection operation is used to preprocess the video frames to extract and process only those moving areas, then when a person stops moving at some point in the video images, the face of that person cannot be detected in the subsequent video frames. Note that this problem does not exist if motion detection module 204 is removed from face-detection-and-tracking subsystem 200, and the entire input video image is processed by the subsequent modules. A technique for detection a person who has stopped moving has been described above in conjunction with FIG. 4. This technique can also be used to continue monitoring the stopped person through more video frames as long as the person remains still and until this person starts moving again. Then, the above-described face tracking techniques can again be applied to the person in motion.

Displaying High Frame Rate

Many surveillance systems include a video previewing feature designed to allow the control center to preview the captured video of each camera in real time. However, because some low-cost CNN-based face detection module 206 implemented on embedded vision system 100 may not be able to run at high frame rate (e.g., at 30 frames per second (fps) video capturing rate), displaying only a subset of processed frames and the associated detected-face bounding boxes can have a very poor visual quality, due to the significantly-reduced frame rate.

In some embodiments, to improve the visual quality in the previewing mode, one disclosed technique is designed to generating a high frame rate display by introducing a delay in the display. Again using FIG. 5 as an example, note that the input video sequence is processed at every 4th frame. To display the captured video, the display starts with a delay of 4 frames, and the first processed Frame 1 is displayed followed by the next three unprocessed Frames 2-4. Next, the second processed Frame 5 is displayed followed by the next three unprocessed Frames 6-8, and the process goes on. Although not all displayed frames will show the detected face bounding boxes, the displayed video can be played at the original frame rate, and therefore can be as smooth as the original video. Note that the illustrated delay 506 of 4 frames is only used as an example. In general delay 506 can be determined based on the processing time required, and set to be greater than the determined processing delay.

Improved Face-Detection and Face-Tracking Subsystem

Figure 7:
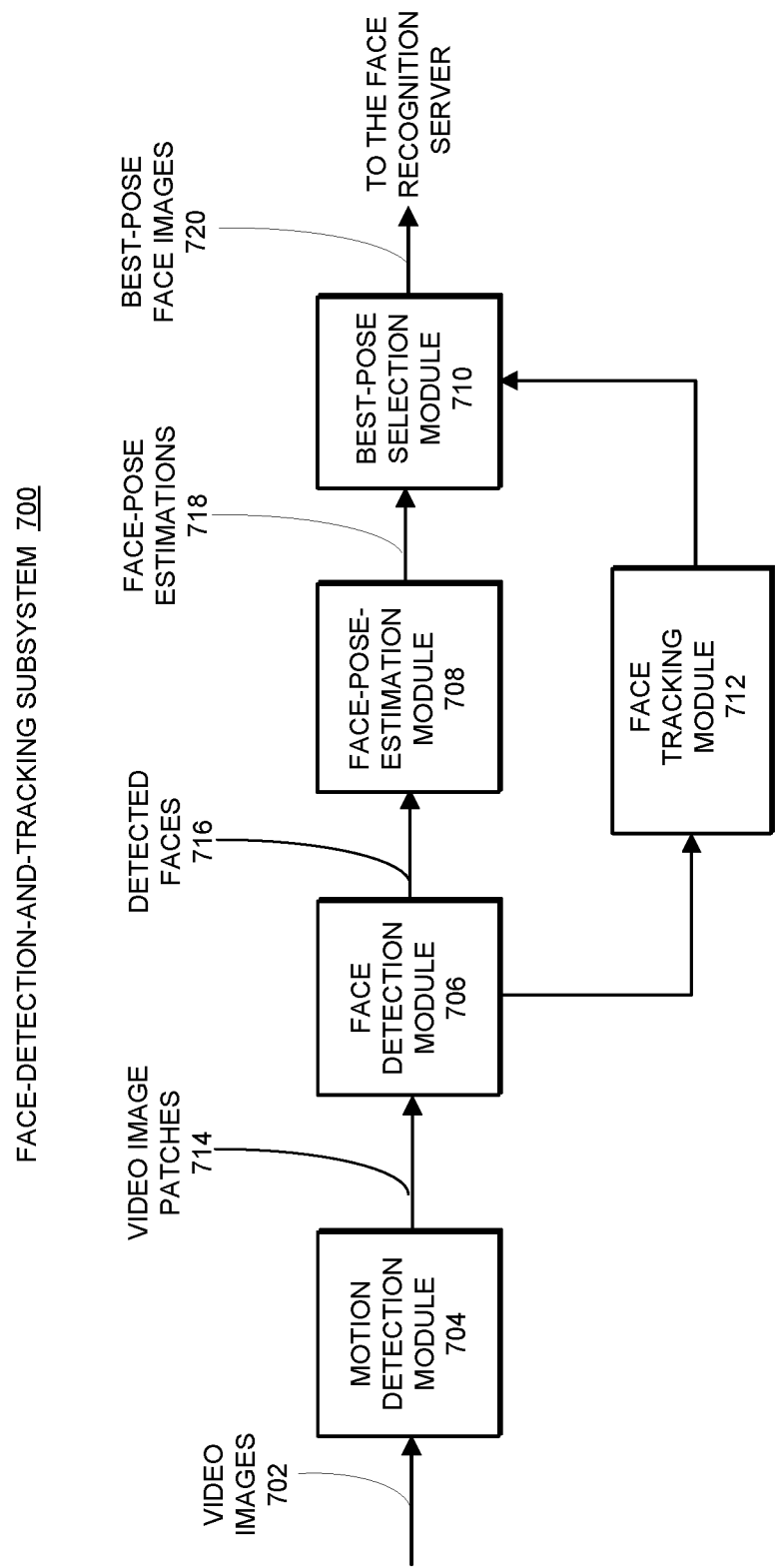
FIG. 7 shows a block diagram of an exemplary implementation of the face-detection-and-tracking subsystem within the embedded vision system of FIG. 1 in accordance with some embodiments described herein.

FIG. 7 shows a block diagram of an exemplary implementation 700 of face-detection-and-tracking subsystem 112 within embedded vision system 100 in accordance with some embodiments described herein. Note that the overall structure of face-detection-and-tracking subsystem 700 is substantially identical to that of face-detection-and-tracking subsystem 200. That is, face-detection-and-tracking subsystem 700 receives a sequence of video images 702 as input and generates a set of best-pose face images 720 for a set of uniquely detected faces/persons from video images 702 as output. Again, face-detection-and-tracking subsystem 700 includes a motion detection module 704, a face detection module 706, a face-pose-estimation module 708, a best-pose-selection module 710, and a face tracking module 712. Face-detection-and-tracking subsystem 700 is configured to detect new faces and track multiple faces within captured video 702 at the same time. Ideally, face-detection-and-tracking subsystem 700 is configured to simultaneously track as many people as possible.

In some embodiments, face detection module 706 can be implemented with a DL-based MTCNN architecture described in Zhang et al., "*Joint Face Detection and Alignment Using Multitask Cascaded Convolutional Networks,*" *IEEE Signal Processing Letters*, Vol. 23, No. 10, pp. 1499-1503, October 2016. This MTCNN architecture integrates face detection and face alignment operations using unified cascaded CNNs through a multi-task learning process. Similar to a cascaded-CNN framework described in Li et al., "*A Convolutional Neural Network Cascade for Face Detection,*" *Proc. IEEE Conf on Computer Vision and Pattern Recognition*, Jun. 1, 2015, the MTCNN also uses several coarse-to-fine CNN stages to operate on different resolutions of the input image. However, in the MTCNN architecture, facial landmark localization, binary face classification, and bounding box calibration are trained jointly using a single CNN in each stage. As a result, only three stages are needed in the MTCNN architecture. More specifically, the first stage of the MTCNN generates candidate facial windows quickly through a shallow CNN. Next, the second stage of the MTCNN refines the candidate windows by rejecting a large number of non-face windows through a more complex CNN. Finally, the third stage of the MTCNN uses a more powerful CNN to further decide whether each input window is a face or not. If it is determined to be so, the locations of five facial landmarks are also estimated. The MTCNN architecture is generally more suitable for implementations on resource-limited embedded vision systems compared to the cascaded CNN framework. Other than using the MTCNN architecture, face detection module 706 can also be implemented with other known or later developed CNN-based face-detection architectures and techniques without departing from the scope of the described technology. Face detection module 706 generates a set of detected faces 716 and the corresponding bounding box locations.

Although the MTCNN architecture is generally applicable to most embedded vision systems, for many embedded vision systems with resource constraints (such as Hi3519 (SoC)), the original MTCNN architecture can still consume a large amount of computational resources, limit the face-detection speed, and ultimately the number of people that can be simultaneous tracked by face detection module 706. In some embodiments, instead of using the original MTCNN architecture to implement face detection module 706, face detection module 706 can be implemented with a "thinner" version of the original MTCNN architecture to speed up the face-detection operation based on a technique described in Howard et al., "*MobileNets: Efficient Convolutional Networks for Mobile Vision Applications,*", *CoRR*, April 2017 (or "MobileNets" hereinafter).

Using the techniques of MobileNets, face detection module 706 can be implemented with a modified MTCNN architecture which uses a reduction parameter α to reduce the number of filters in each of the CONV layers. For a given CONV layer, and a given α, the number of input channels M becomes αM and the number of output channels N becomes αN. In some embodiments, reduction parameter α has a value between 0 and 1, with some typical settings of 0.25, 0.25, 0.5, 0.75, and 1, wherein α=1 means no reduction. For example, when only 75% of the filters are used for all the CONY layers (i.e., α=0.75) in MobileNets, only a slight performance drop was observed in terms of classification accuracy. Similarly, by keeping only 75% of the filters for all the CONV layers in the three networks of the MTCNN architecture, a "0.75 MTCNN" is obtained. For testing, the 0.75 MTCNN is implemented on an embedded platform using ARM Cortex-A7 Core, trained with Wider Face Dataset, and tested with Face Detection Dataset and Benchmark (FDDB) with all R/G/B channels as inputs. The face inference results based on this 0.75 MTCNN architecture showed less than 1% accuracy drop, but the inference speed of the system is reduced by approximate one half. In practice, face detection module 706 based on a thinner MTCNN architecture with a reduction parameter α between (0.5, 0.75) would achieve satisfactory face detection accuracy but significantly faster processing speed.

Note that certain cameras in some embedded vision systems, such as some legacy surveillance systems only capture grayscale video images 702. Moreover, video images 702 may be captured under monochrome and grayscale illumination conditions so that captured video images 702 are closer to grayscale images than to color images. For example, night time illustrations in cities, such as bus station light boxes and street lights, are increasingly using LED light sources, which are mostly monochrome and grayscale in nature. As another example, illuminations for public transportations such as subway stations and inside subway trains are also increasingly using LED lighting. In these situations, surveillance video images captured by cameras are also substantially grayscale images, even if the cameras are capable of capturing color images. Hence, when input video images 702 to face-detection-and-tracking subsystem 700 are grayscale images, image patches 714 to face detection module 706 can be formatted as a single grayscale channel instead of 3 R/G/B channels.

However, the performance of face detection module 706 can be degraded when face detection module 706 is trained using a regular training dataset while the input video images 702 are grayscale images. This is because public training datasets, such as Wider Face Dataset are mostly composed of RGB images captured during natural illumination conditions. Hence, if the CNN within face detection module 706 is trained with RGB images while the input video images 702 are grayscale images, then there can exist a significant amount of data distribution skew between the training dataset and the input images. As such, the trained CNN would have a reduced accuracy when processing grayscale images 702. In a particular performance test, face detection module 706 is implemented with the original MTCNN architecture and trained with RGB images, while the grayscale input images are treated as three identical channels. In this particular test, the face detection performance is found to be sufficient good. However, in another performance test when face detection module 706 is implemented with the aforementioned 0.75 MTCNN, the trained 0.75 MTCNN using RGB training images does not perform well on grayscale input images 702.

One solution to the above-described problem is to reduce the data distribution skew by making the training images and the processed video images to be more consistent with each other. In particular, when the input video images 702 are grayscale images, it is desirable to train face detection module 706 with grayscale images. However, when directly acquiring a large amount of grayscale training images is not feasible, in some embodiments, the training images from a large-scale training database, e.g., Wider Face dataset can be first converted into grayscale images, and these converted grayscale images are subsequently used to train face detection module 706. Note that the same concept can be applied to other situations of particular types of input images. In other words, based on some determined features of video images 702, the training dataset may be modified to reduce the data distribution skew by making the training images more consistent with or similar to video images 702.

Figure 8:
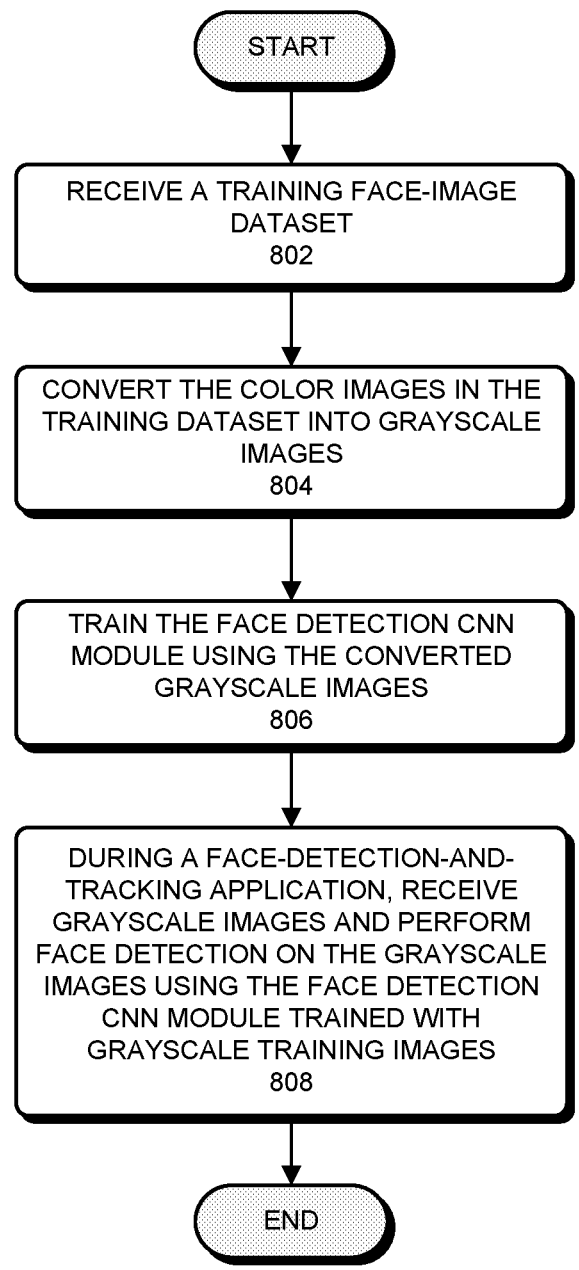
FIG. 8 presents a flowchart illustrating an exemplary process for improving face detection performance on processing grayscale input images in accordance with some embodiments described herein.

FIG. 8 presents a flowchart illustrating an exemplary process for improving face detection performance on processing grayscale input images in accordance with some embodiments described herein. The process begins by receiving a training face-image dataset, e.g., the color FERET Database or Wider Face dataset (step 802). The process next converts the color images in the training dataset into grayscale images (step 804). Next, the process trains the face detection CNN module using the converted grayscale images (step 806). Next, during a face-detection-and-tracking application, the process receives grayscale video images and performs face detection on the grayscale images using the face detection CNN module trained with grayscale training images (step 808).

Based on the above-described technique, the aforementioned performance test is modified. Specifically, the face detection module implemented with 0.75 MTCNN architecture (or the "0.75 MTCNN module") is trained with converted grayscale images of Wider Face dataset and the trained 0.75 MTCNN module is used to process images in the FDDB. It is noticed that the performance of the grayscale-trained 0.75 MTCNN module is only slightly (~1.5%) worse than the RGB-trained full size MTCNN module. However, the performance of the grayscale-trained 0.75 MTCNN module is significantly better on grayscale input images than the performance of RGB-trained 0.75 MTCNN module on the same input images. Hence, the proposed thinner MTCNN_architecture can be combined with the proposed CNN training technique to improve both the performance and the speed of face detection module 706 on processing grayscale input images.

As described above in conjunction with FIGS. 2-3, during a real-time face tracking processing, face-detection-and-tracking subsystem 700 keeps track of the best pose face for each face tracker. When a given face tracker is determined to be lost, and needs to be removed, the current best-pose-face can be transmitted to the server for further analysis, e.g., face recognition. Often times, the face tracker is considered lost when the face is temporarily being blocked by another person or an object in the same image frame. When the blocked face is unblocked and reappears in a subsequent image frame, the face can be detected again. Ideally, the re-detected face should be recognized as an existing face and not a new face. However, simple face tracking techniques based on Kalman filtering and Hungarian algorithm cannot handle such occlusion situation effectively, which often result in generating many near-duplicate faces. If such near-duplicate faces are not recognized by face-detection-and-tracking subsystem 700, duplicated best-pose-faces would be sent to the server which wastes both network bandwidth and storage space.

In some embodiments, to mitigate the above-described problem, prior to sending a best pose face to the server when the associated face tracker is lost, a near-duplicate face detection procedure is performed. More specifically, before sending each best pose face to the server, a feature extraction operation is performed on that best pose face to extract a predetermined image feature from the face image. For example, the predetermined feature can be a HoG feature, a Harr-like feature, a scale-invariant-feature transform (SIFT)-feature, or one of the DL-based face features. However, in some embodiments, more than one type of image feature can be extracted from the best pose face. For example, one example implementation can extract both HoG feature and Harr-like feature from the best pose face.

Next, the extracted image feature is compared one by one with the stored features extracted from previously transmitted best pose faces. Note that these stored features can be stored in a local buffer within the embedded vision system of the face-tracking operation. However, the stored features can also be stored on a remote storage separated from the embedded vision system of the face-tracking operation, e.g., on a cloud server. In some embodiments, for one-dimensional (1D) or two-dimensional (2D) features such as HoG feature and Harr-like feature, a cosine or Euclidean similarity can be computed between the newly extracted feature of the best pose face and a stored feature of a previously transmitted best pose face. Note that when DL-based face features are used, comparing the extracted feature and stored features can detect a duplicated face of a stored face of the same person, but the duplicated fare can have a different pose from the stored face. In some embodiments, if any of the computed similarity values between the newly extracted feature and the stored features is above a predetermined threshold, e.g., 0.8, the best pose face is determined to be a near-duplicate face and will not be sent to the server. However, if all computed similarity values between the newly extracted feature and the stored features are below a predetermined threshold, the best pose face is considered to be associated with a unique face, which is then transmitted to the server and the associated extracted feature is stored into the feature buffer or storage. Using the above-described technique, both the number of near-duplicate faces and transmitted best pose faces can be significantly reduced, thereby saving network bandwidth and storage resources.

Figure 9:
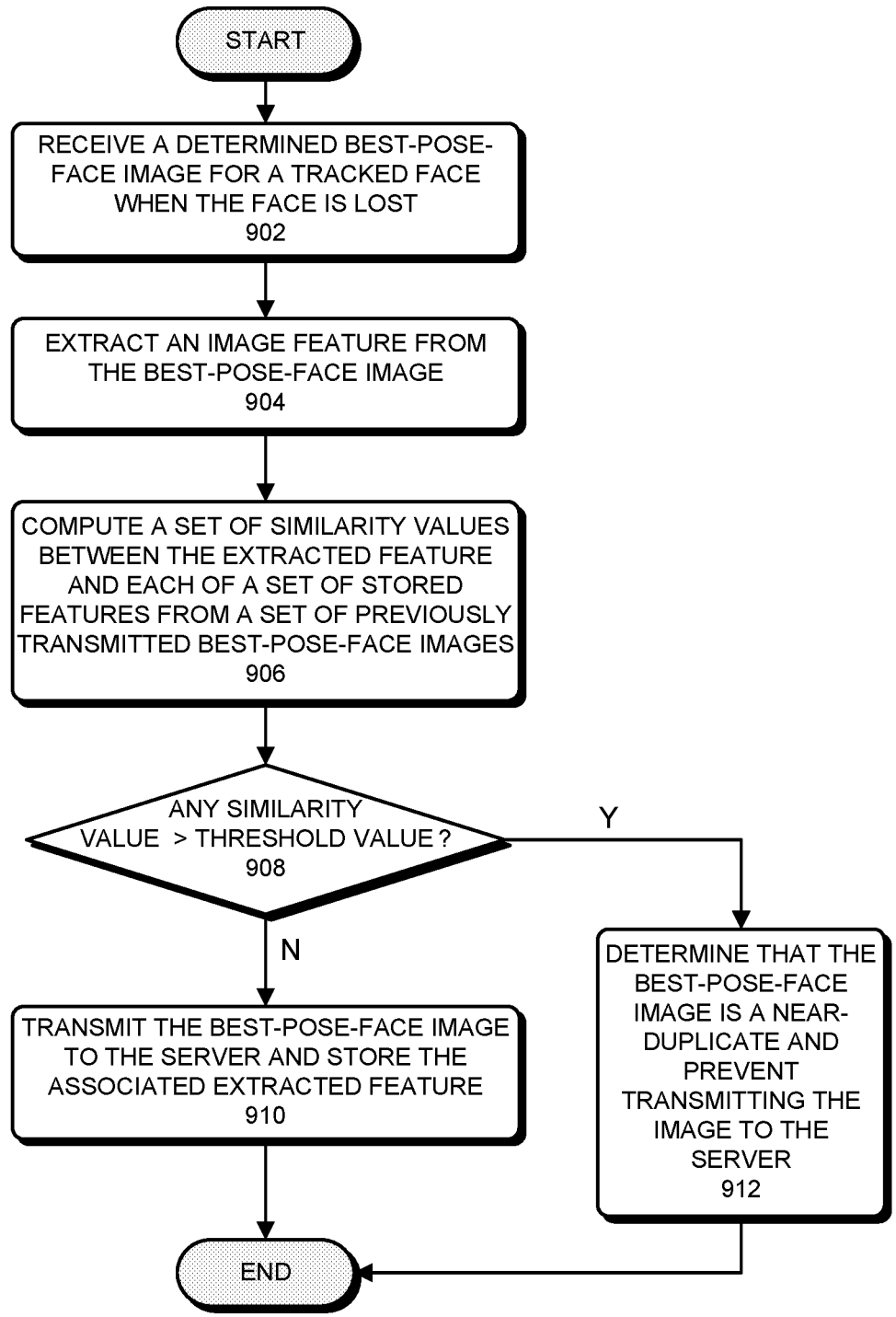
FIG. 9 presents a flowchart illustrating an exemplary process for identifying near-duplicate faces and selectively transmitting best-pose-faces to the server in accordance with some embodiments described herein.

FIG. 9 presents a flowchart illustrating an exemplary process for identifying near-duplicate faces and selectively transmitting best-pose-faces to the server in accordance with some embodiments described herein. The process begins by receiving, at the end of a face-tracking operation, a determined best-pose-face image associated with a tracked face when the face tracker is determined to be lost (step 902). In some embodiments, the tracked face is determined to be lost when the tracked face is blocked by an object for a predetermined number of image frames. The process next extracts an image feature from the best-pose-face image (step 904). As described above, the extracted feature can be a HoG feature, a Harr-like feature, a SIFT-feature, a DL-based face feature, or a combination of the above. Next, the process computes a set of similarity values between the newly extracted feature and each of a set of stored features extracted from a set of previously transmitted best-pose-face images and stored in a feature buffer (step 906). Next, the process determines if any of the computed similarity values is above a predetermined threshold (step 908). If the process determines no computed similarity value is above the predetermined threshold, the process transmits the best-pose-face image to the server and stores the associated extracted feature into the feature buffer (step 910). Otherwise, the process determines that the best-pose-face image is a near-duplicate face and prevents transmitting the best-pose-face image to the server (step 912).

Figure 10:
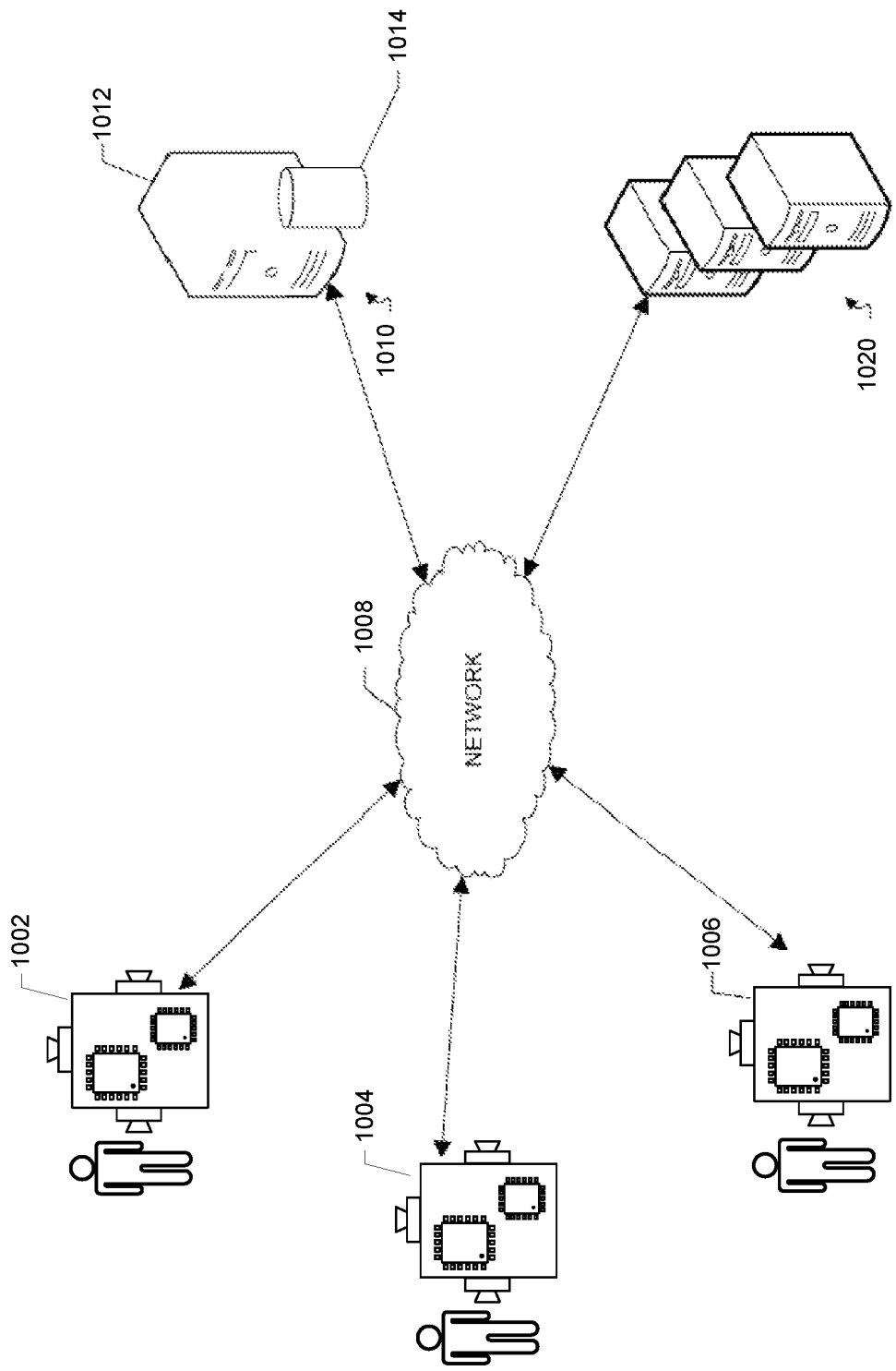
FIG. 10 illustrates an example client-server network environment which provides for implementing the disclosed embedded vision system in accordance with some embodiments described herein.

FIG. 10 illustrates an example client-server network environment which provides for implementing the disclosed embedded vision system in accordance with some embodiments described herein. A network environment 1000 includes a number of embedded vision systems 1002, 1004 and 1006 communicably connected to a server 1010 by a network 1008. One or more remote servers 1020 are further coupled to the server 1010 and/or the one or more embedded vision systems 1002, 1004 and 1006.

In some example embodiments, embedded vision systems 1002, 1004 and 1006 can include surveillance camera systems, machine vision systems, drones, robots, self-driving vehicles, smartphones, PDAs, portable media players, tablet computers, or other embedded systems integrated with one or more digital cameras. In one example, each of embedded vision systems 1002, 1004 and 1006 includes one or more cameras, a CPU, a DSP, and one or more small-scale CNN-modules.

Server 1010 includes a processing device 1012 and a face database 1014. Processing device 1012 is configured to execute programs to perform face analysis on the received face images from embedded vision systems 1002, 1004 and 1006 based on the stored faces in face database 1014. Processing device 1012 is also configured to store processed face images into face database 1014.

In some example aspects, server 1010 can be a single computing device such as a computer server. In other embodiments, server 1010 can represent more than one computing device working together to perform the actions of a server computer (e.g., cloud computing). The server 1010 may host the web server communicably coupled to the browser at the client device (e.g., embedded vision systems 1002, 1004 and 1006) via network 1008. In one example, the server 1010 may host a client application for scheduling a customer-initiated service or a service-provider-initiated service between a service provider and a customer during a service scheduling process. Server 1010 may further be in communication with one or more remote servers 1020 either through the network 1008 or through another network or communication means.

The one or more remote servers 1020 may perform various functionalities and/or storage capabilities described herein with regard to the server 1010 either alone or in combination with server 1010. Each of the one or more remote servers 1020 may host various services. For example, servers 1020 may host services providing information regarding one or more suggested locations such as web pages or websites associated with the suggested location, services for determining location of one or more users, or establishments, search engines for identifying results for a user query, one or more user review or query services, or one or more other services providing information regarding one or more establishments, customers and/or review or feedback regarding the establishments.

Server 1010 may further maintain or be in communication with social networking services hosted on one or more remote server 1020. The one or more social networking services may provide various services and may enable users to create a profile and associate themselves with other users at a remote social networking service. The server 1010 and/or the one or more remote servers 1020 may further facilitate the generation and maintenance of a social graph including the user created associations. The social graphs may include, for example, a list of all users of the remote social networking service and their associations with other users of a remote social networking service.

Each of the one or more remote servers 1020 can be a single computing device such as a computer server or can represent more than one computing device working together to perform the actions of a server computer (e.g., cloud computing). In one embodiment server 1010 and one or more remote servers 1020 may be implemented as a single server or across multiple servers. In one example, the server 1010 and one or more remote servers 1020 may communicate through the user agent at the client device (e.g., embedded vision systems 1002, 1004 and 1006) via network 1008.

Users of embedded vision systems 1002, 1004 and 1006 may interact with the system hosted by server 1010, and/or one or more services hosted by remote servers 1020, through a client application installed at embedded vision systems 1002, 1004 and 1006. Alternatively, the user may interact with the system and the one or more social networking services through a web based browser application at embedded vision systems 1002, 1004 and 1006. Communication between embedded vision systems 1002, 1004 and 1006 and the system, and/or one or more services, may be facilitated through a network (e.g., network 1008).

Communications between embedded vision systems 1002, 1004 and 1006, server 1010 and/or one or more remote servers 1020 may be facilitated through various communication protocols. In some aspects, embedded vision systems 1002, 1004 and 1006, server 1010 and/or one or more remote servers 1020 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Network 1008 can include, for example, any one or more of a personal area network (PAN), a local area network (LAN), a campus area network (CAN), a metropolitan area network (MAN), a wide area network (WAN), a broadband network (BBN), the Internet, and the like. Further, the network 1008 can include, but is not limited to, any one or more of the following network topologies, including a bus network, a star network, a ring network, a mesh network, a star-bus network, tree or hierarchical network, and the like.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A computer-implemented method for identifying near-duplicate face images and selectively transmitting best-pose-face images to a server, the method comprising:
    receiving a determined best-pose-face image associated with a tracked face when the tracked face is determined to be lost;
    extracting an image feature from the best-pose-face image;
    computing a set of similarity values between the extracted image feature and each of a set of stored image features in a feature buffer, wherein the set of stored image features are extracted from a set of previously transmitted best-pose-face images;
    determining if any of the computed similarity values is above a predetermined threshold; and
    if no computed similarity value is above the predetermined threshold,
        transmitting the best-pose-face image to a server; and
        storing the extracted image feature into the feature buffer.

2. The computer-implemented method of claim 1, wherein the tracked face is determined to be lost when the tracked face is blocked by an object for a predetermined number of video frames.

3. The computer-implemented method of claim 1, wherein the image feature is one of or a combination of: a histogram of oriented gradients (HoG) feature, a Harr-like feature, a scale-invariant-feature transform (SIFT)-feature, and a deep-learning-based face feature.

4. The computer-implemented method of claim 1, wherein the set of stored image features is the same type of feature as the extracted image feature.

5. The computer-implemented method of claim 1, wherein computing a similarity value between the extracted image feature and a stored image feature in the set of stored image features includes computing a cosine similarity between the extracted image feature and the stored image feature.

6. The computer-implemented method of claim 1, wherein if the image feature is a deep learning (DL)-based face feature, comparing the extracted image feature with the set of stored image features allows for determining if the tracked face is a duplicated face of a stored face of the same person but having a different pose from the stored face.

7. The computer-implemented method of claim 1, wherein if any of the computed similarity values is above the predetermined threshold, the method further comprises preventing transmitting the best-pose-face image to the server.

8. An embedded system capable of identifying near-duplicate-face images and selectively transmitting best-pose-face images to a server, the embedded system comprising:
    a processor; and
    a memory coupled to the processor,
    wherein the memory storing instructions that, when executed by the one or more processors, cause the system to:
        receive a determined best-pose-face image associated with a tracked face when the tracked face is determined to be lost;
        extract an image feature from the best-pose-face image;
        compute a set of similarity values between the extracted image feature and each of a set of stored image features in a feature buffer, wherein the set of stored image features are extracted from a set of previously transmitted best-pose-face images;
        determine if any of the computed similarity values is above a predetermined threshold; and
        if no computed similarity value is above the predetermined threshold,
            transmit the best-pose-face image to a server; and
            store the extracted image feature into the feature buffer.

9. The embedded system of claim 8, wherein the tracked face is determined to be lost when the tracked face is blocked by an object for a predetermined number of video frames.

10. The embedded system of claim 8, wherein the image feature is one or a combination of: a histogram of oriented gradients (HoG) feature, a Harr-like feature, a scale-invariant-feature transform (SIFT)-feature, and a deep-learning-based face feature.

11. The embedded system of claim 8, wherein computing a similarity value between the extracted image feature and a stored image feature in the set of stored image features includes computing a cosine similarity between the extracted image feature and the stored image feature.

12. The embedded system of claim 8, where if the image feature is a DL-based face feature, comparing the extracted image feature with the set of stored image features allows for determining if the tracked face is a duplicated face of a stored face of the same person but having a different pose from the stored face.

13. The embedded system of claim 8, wherein if any of the computed similarity values is above the predetermined threshold, the system prevents transmitting the best-pose-face image to the serve.

14. The embedded system of claim 8, wherein the embedded system is one of: a surveillance camera system, a machine vision system, a drone system, a robotic system, a self-driving vehicle, and a mobile device.

* * * * *